(12) United States Patent
Stopps

(10) Patent No.: US 9,702,775 B2
(45) Date of Patent: Jul. 11, 2017

(54) TORQUE MEASUREMENT FLEXPLATES

(71) Applicant: Transense Technologies PLC, Oxfordshire (GB)

(72) Inventor: Alexander Thomas James Stopps, Oxford (GB)

(73) Assignee: Transense Technologies PLC (GB)

(*) Notice: Subject to any disclaimer, the term of this patent is extended or adjusted under 35 U.S.C. 154(b) by 0 days.

(21) Appl. No.: 14/769,697

(22) PCT Filed: Feb. 24, 2014

(86) PCT No.: PCT/GB2014/050552
§ 371 (c)(1),
(2) Date: Aug. 21, 2015

(87) PCT Pub. No.: WO2014/128506
PCT Pub. Date: Aug. 28, 2014

(65) Prior Publication Data
US 2015/0377725 A1 Dec. 31, 2015

(30) Foreign Application Priority Data

Feb. 22, 2013 (GB) .................................. 1303219.8

(51) Int. Cl.
G01L 3/02 (2006.01)
G01L 3/14 (2006.01)
(Continued)

(52) U.S. Cl.
CPC .............. *G01L 3/14* (2013.01); *G01L 3/1457* (2013.01); *G01L 1/2231* (2013.01); *G01L 5/161* (2013.01)

(58) Field of Classification Search
CPC ....... G01L 1/2231; G01L 3/14; G01L 3/1457; G01L 5/161
(Continued)

(56) References Cited

U.S. PATENT DOCUMENTS 4,448,083 A * 5/1984 Hayashi .................. G01L 5/161
73/862.042
4,573,362 A * 3/1986 Amlani ................. G01L 1/2218
73/862.044
(Continued)

FOREIGN PATENT DOCUMENTS

DE 4208522 9/1993
EP 1353159 10/2003
(Continued)

OTHER PUBLICATIONS

International Search Report and Written Opinion dated Jun. 6, 2014, from International Stage PCT Application No. PCT/GB2014/050552.
(Continued)

*Primary Examiner* — Max Noori
(74) *Attorney, Agent, or Firm* — Keusey & Associates, P.C.

(57) ABSTRACT

A torque measurement flexplate (20) includes a substantially planar body (54) which defines a plurality of circumferentially distributed axial through apertures (22), a radial web (24) extending between each pair of adjacent axial apertures (22). The flexplate (20) further defines a plurality of circumferentially distributed axial outer fastening holes (26) for attachment to an output member. The flexplate (20) includes a strain sensor (28) for measuring the shear strain field on the flexplate (20). The flexplate (20) defines a recess (30) in which the strain sensor (28) is located, the recess (30) being defined in an axial surface (32) of one of the radial webs (24) such that, in use, the sensor (28) lies at least proximate to one of the local neutral axes (34) relating to one of a plurality of unwanted strains (36) to which the flexplate (20) is subject in use.

18 Claims, 4 Drawing Sheets

(51) Int. Cl.
*G01L 5/16* (2006.01)
*G01L 1/22* (2006.01)

(58) Field of Classification Search
USPC ............ 73/862.041–862.046, 862.331
See application file for complete search history.

(56) References Cited

U.S. PATENT DOCUMENTS

| | | | | |
|---|---|---|---|---|
| 5,894,094 A * | 4/1999 | Kuchler | ............... | G01L 1/2262 |
| | | | | 73/146 |
| 6,253,626 B1 * | 7/2001 | Shoberg | ............... | G01L 5/161 |
| | | | | 73/775 |
| 6,269,702 B1 * | 8/2001 | Lambson | ............... | G01L 3/108 |
| | | | | 73/862.045 |
| 6,441,324 B1 * | 8/2002 | Stimpson | ............ | G01G 19/042 |
| | | | | 177/137 |
| 6,619,102 B2 * | 9/2003 | Salou | ............... | F16D 66/00 |
| | | | | 384/448 |
| 7,743,672 B2 * | 6/2010 | Kurtz | ............... | G01L 3/1457 |
| | | | | 73/862.041 |
| 8,627,730 B2 * | 1/2014 | Valov | ............... | G01L 3/1457 |
| | | | | 73/862.044 |
| 8,726,741 B2 * | 5/2014 | Krippner | ............... | G01L 3/1457 |
| | | | | 73/862.041 |
| 8,887,581 B2 * | 11/2014 | Zaaijer | ............... | F16C 19/522 |
| | | | | 73/862.041 |
| 2004/0045372 A1 * | 3/2004 | Liu | ............... | G01L 5/161 |
| | | | | 73/862.041 |
| 2009/0013803 A1 | 1/2009 | Lohr et al. | | |
| 2009/0120208 A1 * | 5/2009 | Meyer | ............... | G01L 3/1478 |
| | | | | 73/862.045 |
| 2011/0303020 A1 | 12/2011 | Valov et al. | | |

FOREIGN PATENT DOCUMENTS

| | | |
|---|---|---|
| EP | 1994386 | 12/2009 |
| GB | 2436149 | 9/2007 |

OTHER PUBLICATIONS

GB Intellectual Property Office Search Report May 29, 2014, from GB1303219.8.

* cited by examiner

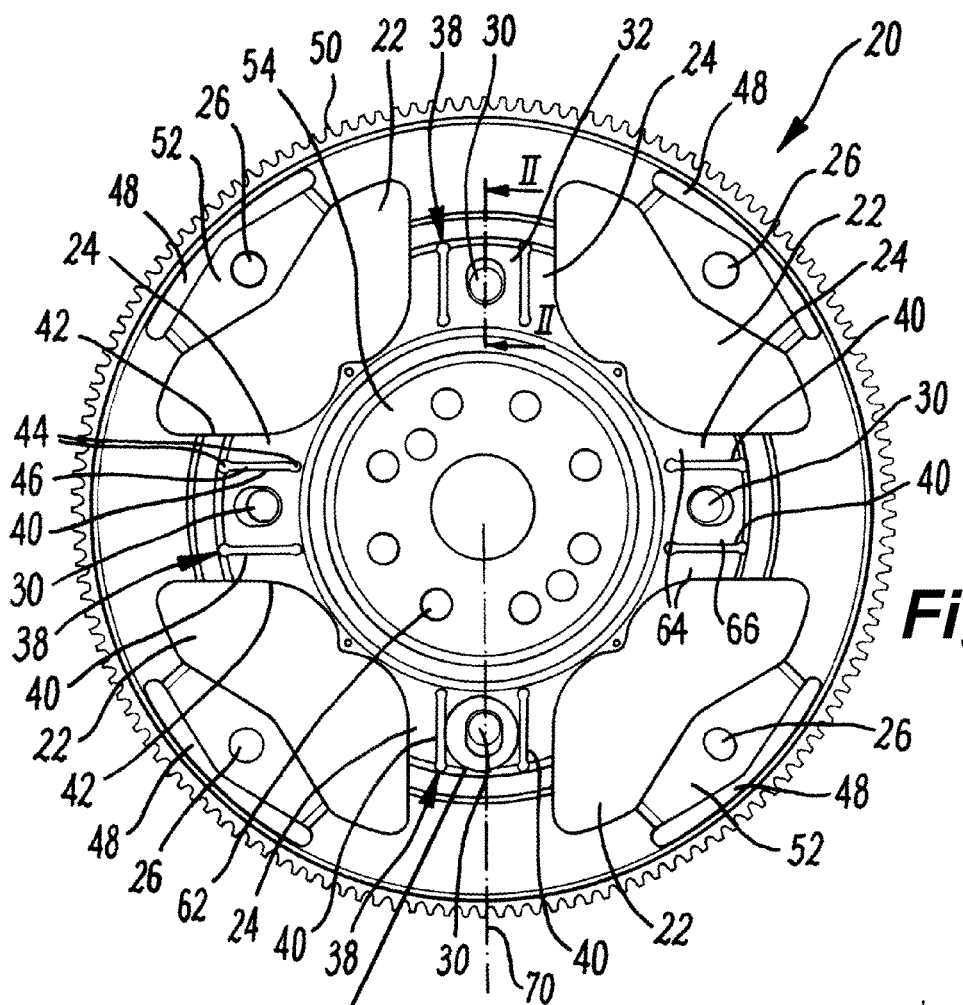
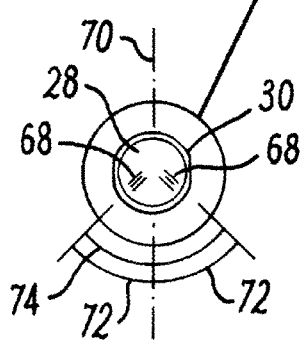
Fig. 3
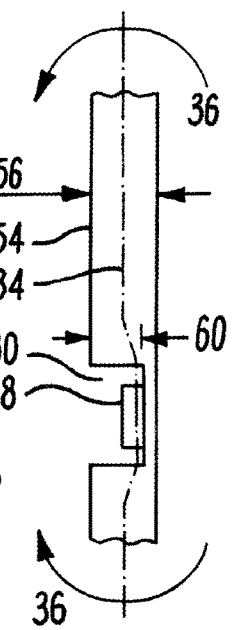
Fig. 2
Fig. 1

TORQUE MEASUREMENT FLEXPLATES

The present invention relates to torque measurement flexplates.

In an automatic transmission equipped automotive powertrain, the engine output is transferred from a bolted flange at the end of a crankshaft, via a flexible steel disk referred to as a flexplate, to a torque convertor by a second group of bolted fastenings (typically three or four) on a significantly larger radius. The flexplate also includes a starter ring gear around its periphery.

Torque needs to be measured in the powertrain for testing purposes to develop an engine and/or transmission model for a particular platform and, in each individual vehicle, to provide optimum engine/transmission control during the whole life of the vehicle.

It is known to utilise SAW sensing elements to measure torque being transmitted via the flexplate. SAW sensing elements advantageously permit wireless interrogation without requiring an installed power supply at the sensing elements and have a frequency response sensitive to strain at UHF, for instance, 420-450 MHz.

However, the number of the sensing elements that can be installed on the flexplate is limited. In order to simplify the flexplate torque transducer design and reduce its cost, it is known to use a relatively small number of SAW sensing elements capable of measuring local shear strain. Such arrangements, however, respond not only to the useful torque but also to out-of-plane bending, axial loads and side loads that are present in the powertrain due to misalignment and the weight of the transmission parts causing their bending. Such superimposed, parasitic, and unwanted bending and axial strains due to couples acting out-of-plane (OOP) to the flexplate are referred to in this specification for simplicity as unwanted strains. Unwanted strains cause inaccuracy in the measurement of the torque transmitted through the flexplate.

The Applicant's earlier patent, EP1994386, describes a number of ways of minimising the effects on the torque measurement of unwanted strains:

1. 'The active surface of the measuring sensors are placed on the local neutral axis of the drive coupling plate . . . .'
2. 'The measurement sensor or sensors are placed symmetrically on the web(s) so as to minimise strains due to twisting—again due to couples acting OOP to the drive coupling plate . . . .'
3. 'Decoupling slots are introduced between the torque converter fastening holes and the starter ring in order to create relatively compliant fixtures which absorb, to a significant extent, the deflections due to axial loading and OOP couples . . . .'

Although these features reduce unwanted strain effects, such effects are still present. Further investigation by the Applicant has shown that different strain effects have different neutral axes, located in different locations. Thus, the location of the active surface of the measuring sensors on a so-called "local neutral axis" has been found to be over simplistic. There are in fact several neutral axes, and the previously identified "local neutral axis" may be an amalgam of a plurality of actual neutral axes, or the most prominent of the actual neutral axes.

According to a first aspect of the present invention, there is provided a torque measurement flexplate, the flexplate defining a plurality of circumferentially distributed axial through-apertures, a radial web extending between each pair of adjacent apertures, the flexplate further defining a plurality of circumferentially distributed axial outer fastening holes for attachment to an output member, the flexplate including a strain sensor for measuring the shear strain field on the flexplate, the flexplate defining a recess in which the strain sensor is located, the recess being defined in an axial surface of one of the radial webs such that, in use, the sensor lies at least proximate to one of the local neutral axes relating to one of a plurality of unwanted strains to which the flexplate is subject in use.

Possibly, the sensor lies at least proximate to the neutral axis of twisting of the respective radial web in which the sensor is located.

Possibly, each radial web includes a formation for reducing the effect of twisting of the respective radial web in which the sensor is located.

Possibly, each radial web defines a pair of elongate slots, which provide the twist effect reduction formation, and which may be located one on either side of the recess and may extend along the length of the radial web. Possibly, the slots are equispaced either side of the recess. Possibly, the slots are through slots.

Possibly, the slots extend substantially parallel to each other. Alternatively, the slots may extend substantially radially.

Possibly, each slot includes a rounded end part, and may have a rounded end part at each end. Possibly, each slot includes a body part. Possibly, each rounded end part is enlarged relative to the body part.

Possibly, each slot is located in an area which is between 15% and 40% of the minimum width of the radial web from a side of the radial web.

Possibly, the flexplate further defines a plurality of circumferentially extending slots, one of which may be located between each fastening hole and the outer edge of the flexplate. Possibly, the number and radial location of the circumferentially extending slots correspond with the number and radial location of the axial through apertures. Possibly, the flexplate includes a circumferential web which extends between each circumferentially extending slot and the corresponding axial through aperture.

Possibly, the number and radial location of the fastening holes correspond with the number and radial location of the axial through apertures. Possibly, each fastening hole is located in the circumferential web between one of the axial through apertures and one of the circumferentially extending slots. Possibly, the centreline of each fastening hole lies on substantially the same radius as the centreline of the corresponding axial through aperture, the corresponding circumferential web and the corresponding circumferentially extending slot.

Possibly, the flexplate comprises a substantially planar body having a substantially uniform thickness. Possibly, the thickness of the circumferential web may be reduced relative to the thickness of the flexplate body. Possibly, the thickness of the circumferential web is less than 75% of the thickness of the flexplate body and may be greater than 30% of the flexplate body thickness.

Possibly, the depth of the recess is greater than 40% of the flexplate body thickness, and may be greater than 50% of the flexplate body thickness. Possibly, the depth of the recess is less than 75% of the thickness of the flexplate body.

Possibly, the sensor lies substantially on one of the local neutral axes relating to one of a plurality of unwanted strains to which the flexplate is subject in use.

Possibly, the sensor lies substantially on the neutral axis of twisting of the respective radial web in which the sensor is located.

Possibly, the flexplate a number of sensors and recesses which corresponds to the number of radial webs. Possibly, the recesses are only defined in one face of the flexplate at each location.

Possibly, the flexplate includes only three or only four through apertures which correspondingly form three or four radial webs.

Possibly, the or each strain sensor is a surface acoustic wave (SAW) device, which communicates in a non-contacting manner and which does not require active electronic components on the flexplate. Possibly, the strain sensor does not require an installed power supply. Each strain sensor may include a pair of sensing elements, which may be arranged so that unwanted strains due to longitudinal bending of the respective radial web are substantially cancelled by common mode signal subtraction. The sensing elements may be arranged at a first angle to each other. The first angle may be substantially 90°. Possibly, both sensing elements are arranged substantially at a second angle to the longitudinal centreline axis of the respective radial web. Possibly, the second angle is substantially 45°.

According to a second aspect of the present invention, there is provided a method of sensing torque in a power train, the method including providing a flexplate, the flexplate defining a plurality of circumferentially distributed axial through-apertures, a radial web extending between each pair of adjacent apertures, the flexplate further defining a plurality of circumferentially distributed axial fastening holes for attachment to an output member, the flexplate including a strain sensor for measuring the shear strain field on the flexplate, the flexplate defining a countersunk recess in which the strain sensor is located, the recess being defined in an axial surface of one of the radial webs such that, in use, the sensor lies at least proximate to one of the local neutral axes relating to one of a plurality of unwanted strains to which the flexplate is subject in use.

Possibly, the method includes any of the steps and features described above. Possibly, the flexplate includes any of the features described above.

Embodiments of the present invention will now be described, by way of example only, and with reference to the accompanying drawings, in which:—

FIG. 1 is a plan view of a flexplate;

FIG. 2 is a side cross sectional view through a recess of the flexplate of FIG. 1 as indicated by the line II-II in FIG. 1;

FIG. 3 is a relatively enlarged plan sectional view of a sensor of the flexplate of FIG. 1;

Figure 4:
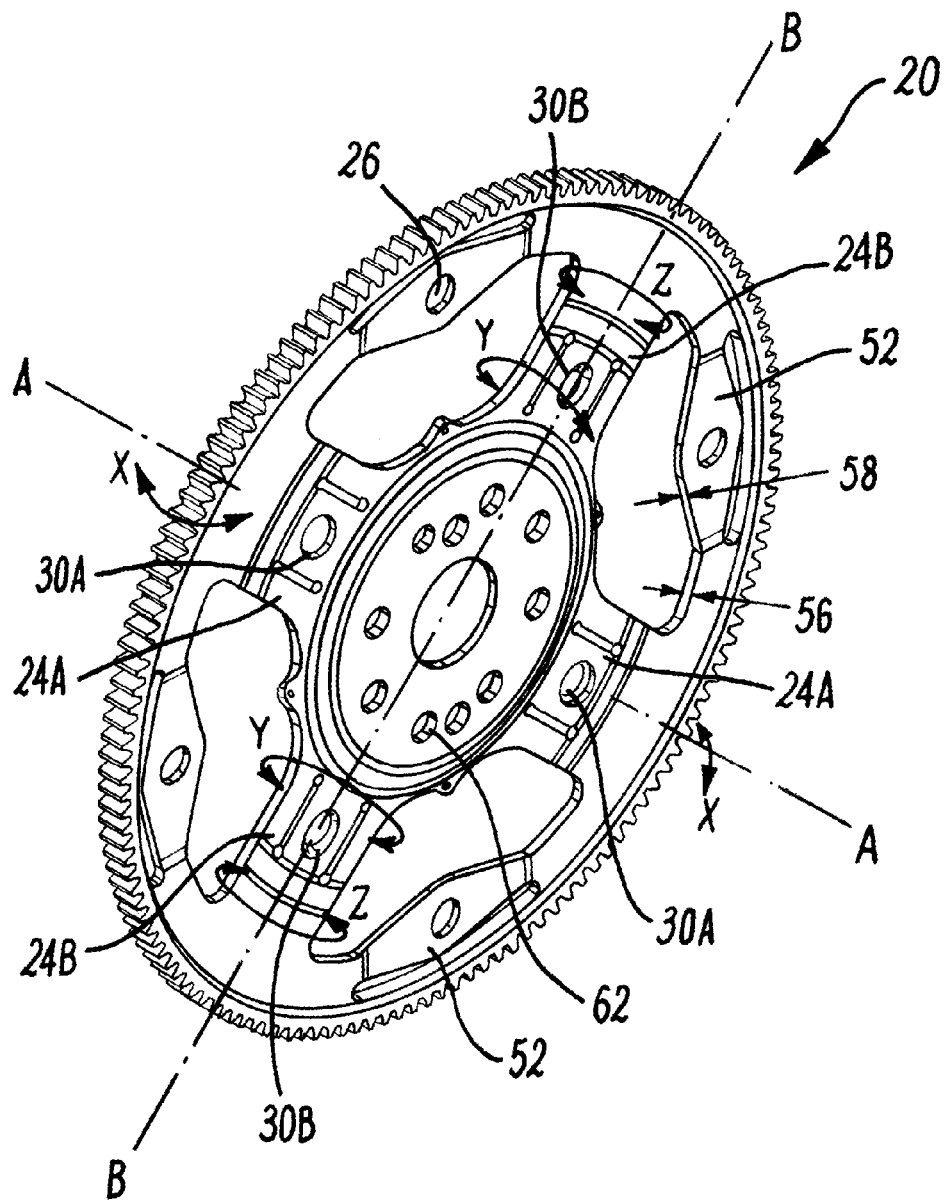
FIG. 4 is a perspective view of the flexplate of FIG. 1.

FIGS. 1 to 4 show a flexplate 20. The flexplate 20 includes a substantially planar body 54 which defines a plurality of circumferentially distributed axial through apertures 22, a radial web 24 extending between each pair of adjacent axial apertures 22. The flexplate 20 further defines a plurality of circumferentially distributed axial outer fastening holes 26 for attachment to an output member (not shown) such as a torque converter. The flexplate 20 includes a strain sensor 28 for measuring the shear strain field on the flexplate 20. The flexplate 20 defines a recess 30 in which the strain sensor 28 is located, the recess 30 being defined in an axial surface 32 of one of the radial webs 24 such that, in use, the sensor 28 lies at least proximate to one of the local neutral axes 34 relating to one of a plurality of unwanted strains 36 to which the flexplate 20 is subject in use.

The flexplate 20 defines a plurality of inner fastening holes 62 for attachment to an input member such as a bolted flange at the end of a crankshaft.

More specifically, the sensor 28 lies at least proximate to the neutral axis 34 of twisting of the respective radial web 24 in which the sensor 28 is located.

Each radial web 24 includes a formation 38 for reducing the effect of twisting of the respective radial web 24 in which the sensor 28 is located.

Each radial web 24 defines a pair of elongate through slots 40, which provide the twist effect reduction formation 38, and which are located one on either side of the recess 30, extending along the length of the radial web 24. The slots 40 are equispaced either side of the recess 30.

Each slot 40 includes a body part 46 with a relatively slightly enlarged rounded end part 44 at each end.

Each slot 40 is located in an area which is between 15% and 40% of the minimum width of the radial web 24 from a side 42 of the radial web 24.

Each radial web has a pair of sides 42, which at least in part are substantially parallel. In the example shown, the slots 40 extend substantially parallel to each other and to the radial web sides 42.

The slots 40 divide the radial web 24 into three parts: a pair of outer parts 64 and an inner part 66. Each of these parts 64, 66 is at least in part of uniform width (ie parallel sided) which reduces stress concentrations.

The flexplate 20 defines a plurality of circumferentially extending slots 48, one of which is located between each outer fastening hole 26 and the outer edge 50 of the flexplate 20. The number and radial location of the circumferentially extending slots 48 correspond with the number and radial location of the axial through apertures 22 and the outer fastening holes 26. The flexplate 20 includes a circumferential web 52 which extends between each circumferentially extending slot 48 and the corresponding axial through aperture 22.

Each outer fastening hole 26 is located in the circumferential web 52 between one of the axial through apertures 22 and one of the circumferentially extending slots 48. The centreline of each outer fastening hole 26 lies on substantially the same radius as the centreline of the corresponding axial through aperture 22, the corresponding circumferential web 52 and the corresponding circumferentially extending slot 48.

The body 54 has a substantially uniform thickness.

Usually, each radial web 24 defines a recess 30 in which a sensor 28 is located. The recesses 30 are only defined in one face of the flexplate 20 at each location. In one example, all of the recesses 30 are defined in the same face.

In one configuration, the flexplate 20 could include three through apertures 22 which correspondingly form three radial webs 24, each having one recess 30 with one sensor 28.

In another configuration as shown in FIGS. 1 and 4, the flexplate 20 could include four through apertures 22 which correspondingly form four radial webs 24, each having one recess 30 with one sensor 28.

Each strain sensor 28 is a surface acoustic wave (SAW) device, which communicates in a non-contacting manner and which does not require active electronic components on the flexplate 20 and does not require an installed power supply. As shown in FIG. 3, each strain sensor 28 includes a pair of sensing elements 68, which are arranged substantially at a first angle 74 of 90° to each other, and both sensing elements 68 are arranged substantially at a second angle 72 of 45° to the longitudinal centreline axis 70 of the respective radial web 24, which is also a radius of the flexplate 20.

As discussed above, conventional flexplates such as those disclosed in EP1994386 locate the sensor in proximity to a so-called "local neutral axis". However, further investigation by the Applicant has shown that the concept of a single neutral axis for all of the unwanted strains is over simplistic. This can be illustrated as follows.

As shown in FIG. 4, the flexplate 20 includes four radial webs 24 symmetrically arranged. For the purposes of illustration, the radial webs 24 can be considered to be arranged in pairs 24A and 24B along axes A-A and B-B respectively. In use, the flexplate 20 is subject to a bending moment indicated by arrows X around axis B-B which causes longitudinal bending of the radial webs 24A. The same bending moment X causes torsion or twisting of the radial webs 24B, indicated by arrows Y, Z.

Similarly, a bending moment (not shown) around the axis A-A would cause longitudinal bending of the radial webs 24B and torsion or twisting of the radial webs 24A.

At intermediate rotational points the radial webs 24 will be subject to both longitudinal bending and twisting moments. In use, rotation of the flexplate 20 will subject the radial webs 24 to rapid cycling from bending to twisting. Furthermore, in use, the flexplate 20 may be subject to a plurality of different OOP moments.

Analysis by the Applicant has shown that the locations of the longitudinal bending neutral axis and the twisting neutral axis are not the same, or at the same depth in the radial web 24.

The Applicant has found that for longitudinal bending, the neutral axis follows very locally the median line through the flexplate body thickness 56. In contrast, as shown in FIG. 2, the twisting neutral axis 34 lies higher up in the cross section, largely following the median global thickness of the cross section. This neutral axis discrepancy poses a problem, as it means that the sensor 28 cannot be laid on a common neutral axis in different types of OOP bending scenarios. (Relative to the twisting neutral axis 34 shown in FIG. 2, the longitudinal bending neutral axis in the locality of the sensor 28 would be located deeper.)

The Applicant has found that for longitudinal bending, careful sensor design and arrangement can be used to minimise unwanted strains. The arrangement of the sensing elements substantially at 90° to each other and substantially at 45° to the length of the respective radial web 24 provides the advantage that unwanted strains due to longitudinal bending of the respective radial web are substantially cancelled by common mode signal subtraction. With such a sensor design, only one sensor 28 with two sensing elements is required to provide the common mode signal subtraction. When an even plurality of sensors 28 are utilised (for example, as shown in FIGS. 1 and 4) the signals provided by sensors 28 located on diametrically opposed radial webs 24 can also be used to provide common mode signal subtraction.

For unwanted strains due to twisting, where there is an even plurality of sensors 28 (for example, as shown in FIGS. 1 and 4) the signals provided by sensors 28 located on diametrically opposed radial webs 24 can again be used to provide common mode signal subtraction. However, in the case where there is an uneven number of sensors, common mode signal subtraction cannot be used to reduce the effect of unwanted strains, and the arrangement of the sensor 28 does not provide common mode signal subtraction. Hence the consideration of the different neutral axes leads the Applicant to locate the sensor 28 on the twisting neutral axis 34.

It can be difficult to accurately locate the sensor 28 on the twisting neutral axis 34 because of practical difficulties in manufacturing. Therefore, for practical purposes, because there will be inaccuracy in placement of the sensor 28 on the twisting neutral axis 34, not all of the unwanted strains due to bending will be eliminated.

The Applicant has found that the radial slots 40 which divide the radial web 24 into three parallel parts have the effect of decoupling the inner part 66 in which the sensor 28 is located from the effect of the twisting. Upon twisting as a result of certain couples OOP to the drive coupling plate, the bending forces are substantially reacted by the outer parts 64. The inner part 66 containing the SAW sensor is effectively decoupled somewhat from the twisting forces.

The provision of the radial slots 40 creates a stress raising effect particularly during in-plane torque, which can affect the service life of the flexplate 20 through fatigue failure. The relatively enlarged rounded end parts 44 assist in reducing localised stress concentrations which could lead to failure in service.

Referring to FIG. 2, in one embodiment of the invention, the depth 60 of the recess 30 is arranged so that the sensor 28 lies substantially on the neutral axis 34 of longitudinal bending.

In one example, the depth 60 of the recess 30 could be greater than 40% of the flexplate body thickness 56. In another example the depth 60 could be greater than 50% of the flexplate body thickness 56. In another example the depth 60 could be less than 75% of the thickness 56.

The Applicant has also found that reducing the thickness 58 of the circumferential web 52 relative to the thickness 56 of the flexplate body 54 reduces the bending stiffness of the circumferential web 52. This has been shown to further assist in decoupling the sensors 28 from the forces associated with the OOP couples.

In one example, the thickness 58 of the circumferential web 52 could be less than 75% of the thickness 56 of the flexplate body 54 and could be greater than 30% of the flexplate body thickness 56.

FIGS. 5 to 8 show graphs in which the effects of the twist effect reducing formations 38 in the form of the radial slots 40 and reduced thickness circumferential webs 52 on the surface strain from OOP couples have been preliminarily validated with FEA models testing each feature independently. In the graphical plots the plain line 10 corresponds to the in-plane applied torque. This is the desired signal. The line with circles 11 corresponds to unwanted strain due to twisting (referred to as OOP 90 in the glossary on the graphs) and the line with crosses 12 corresponds to the unwanted strain due to longitudinal bending (referred to as OOP 0 in the glossary on the graphs).

Figure 5:
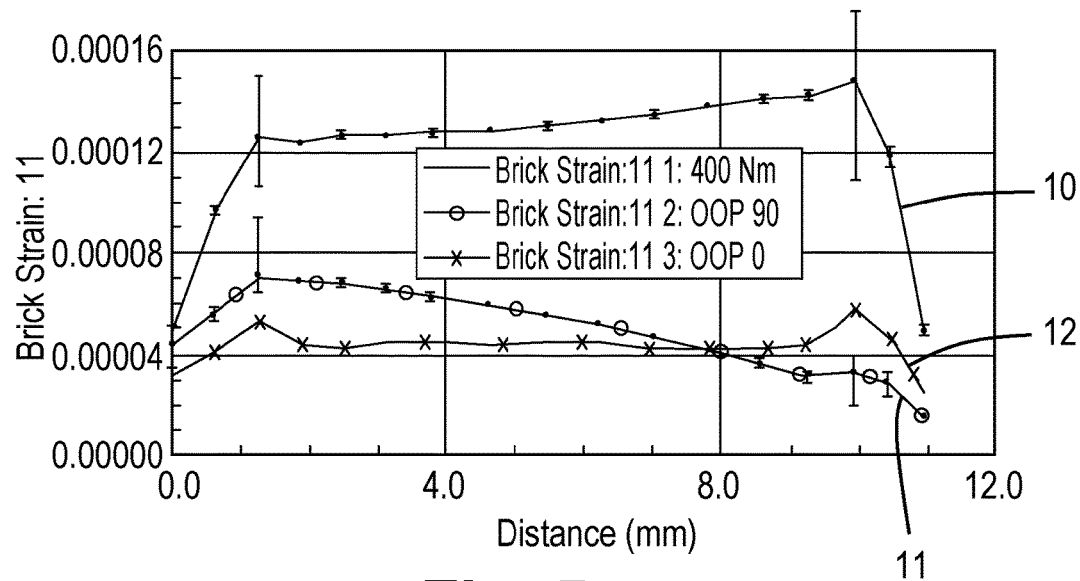
FIG. 5 is a graph showing strain readings for a conventional flexplate.

FIG. 5 shows results generated by a conventional flexplate, as a comparison basis or control.

Figure 6:
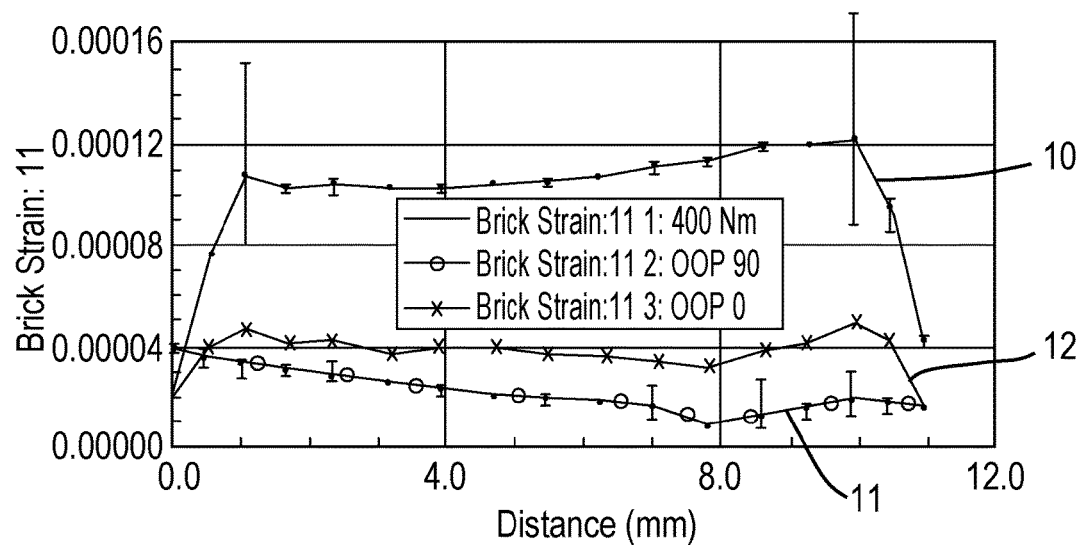
FIG. 6 is a graph showing strain readings for a flexplate with reduced thickness circumferential webs.

In FIG. 6, the reduced thickness circumferential webs 52 are shown to reduce the unwanted strains of both bending and twisting, but with a more marked reduction of the unwanted strain due to twisting.

Figure 7:
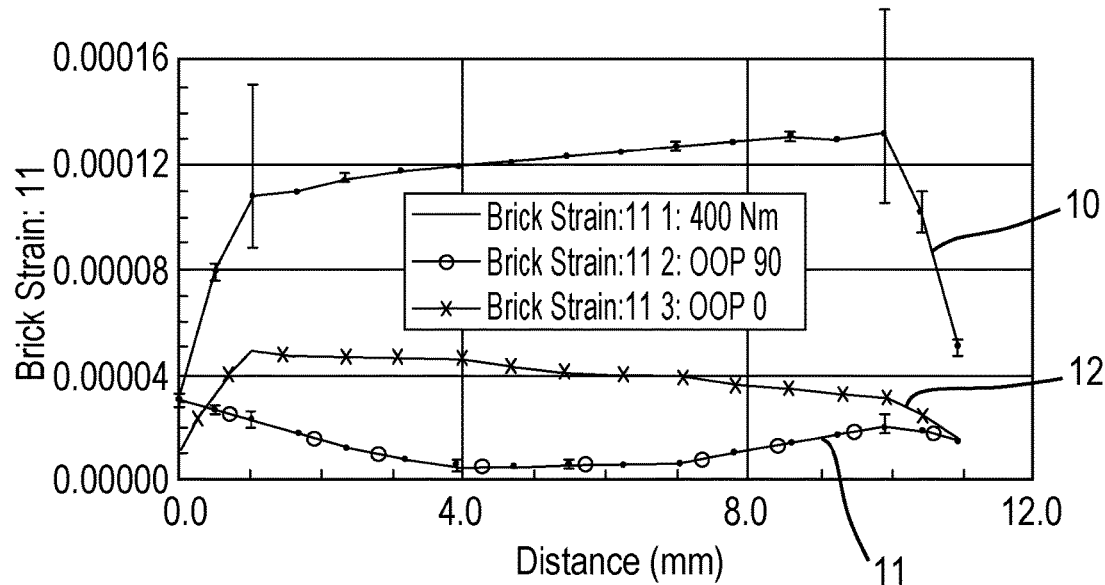
FIG. 7 is a graph showing strain readings for a flexplate with twist effect reducing formations.

In FIG. 7, the radial slots 40 are shown to have a dramatic effect on the unwanted strain due to twisting, but relatively little effect on the unwanted strain due to longitudinal bending.

Figure 8:
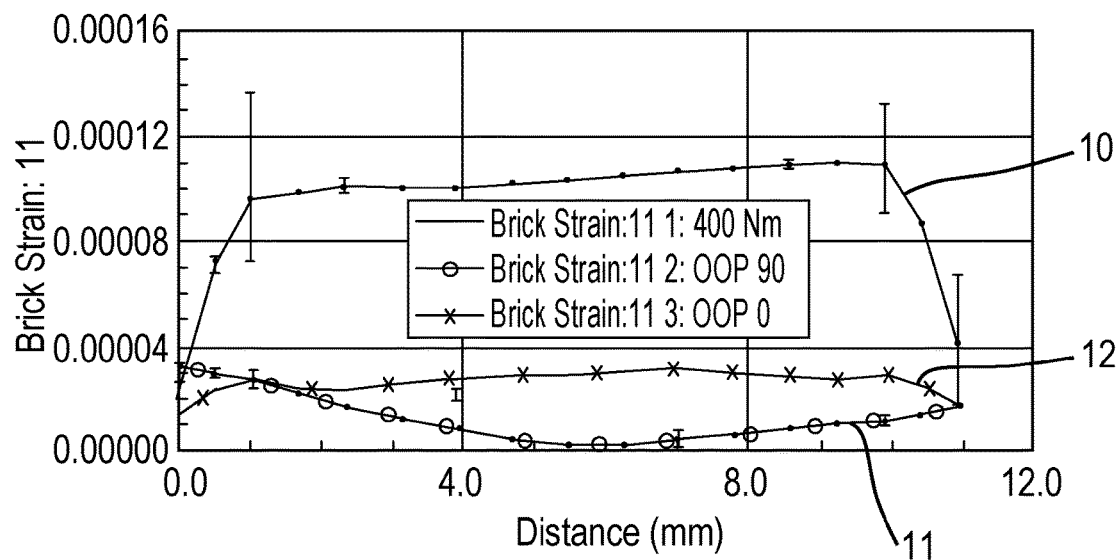
FIG. 8 is a graph showing strain readings for a flexplate with both reduced thickness circumferential webs and twist effect reducing formations.

FIG. 8 shows the effect of both the radial slots 40 and the reduced thickness circumferential webs 52. Using both of these features results in a significant overall reduction in both the unwanted strains due to bending and twisting. This graph shows some surprising effects when both of the features are utilised together, as shown in Table 1 below.

TABLE 1

Results from graphs at 1 mm distance

| Graph | Useful torque reading | Unwanted strain from bending OOP 0 | Reduction in OOP 0 over conventional | Unwanted strain from twisting OOP 90 | Reduction in OOP 90 over conventional |
|---|---|---|---|---|---|
| 1 (Conventional) | 12.5 | 5.5 | | 7.0 | |
| 2 (Reduced thickness circumferential web) | 11.0 | 4.5 | −1.0 | 3.5 | −3.5 |
| 3 (Radial slots) | 11.0 | 4.5 | −1.0 | 2.5 | −4.5 |
| 4 (Combined) | 10.0 | 2.5 | −3.0 | 2.5 | −4.5 |

Surprisingly the effect of the combination of features in particular on the unwanted bending strain is greater than anticipated. Although this is not a uniform finding across all of the results, it has been found to be always advantageous, sometimes surprisingly so, to utilise the combination of features. The significance of these results will be apparent when it is realised that the unwanted strains have been reduced by at least 50% in comparison with the conventional arrangement, and that the unwanted strains are relatively high in comparison with the useful torque.

There is thus provided a torque measurement flexplate 20 which provides a number of advantages over conventional torque measurement flexplates. Different locations for the neutral axes for bending and twisting have been identified. Unwanted strains due to longitudinal bending can be cancelled or at least minimised by the use of the sensor arrangement described above. Advantageously, the sensor 28 is located on the neutral axis for twisting. However, inaccuracies in placement may result in unwanted strains due to twisting still being present. Radial slots 40 are provided which isolate the sensor 28 from the effects of twisting and hence reduce further the unwanted strains due to twisting. Reduced thickness circumferential webs 52 have an overall effect in reducing unwanted strains from both bending and twisting. Providing both radial slots 40 and reduced thickness circumferential webs 52 has been shown to have a surprisingly beneficial effect in reducing the unwanted strains.

Various other modifications could be made without departing from the scope of the invention. The flexplate could be of any suitable size and shape, and could be formed of any suitable material. The radial slots, axial through apertures, and circumferentially extending apertures could be of any suitable size and shape. In one example, the slots 40 could extend substantially radially, rather than mutually parallel. There could any suitable number of radial webs, recesses and sensors.

The invention claimed is:

1. A torque measurement flexplate comprising:
   a flexplate having a plurality of circumferentially distributed axial through-apertures; and
   a radial web extending between each pair of adjacent apertures,
   wherein the flexplate further includes: a plurality of circumferentially distributed axial outer fastening holes for attachment to an output member; a strain sensor for measuring the shear strain field on the flexplate; a recess within the flexplate in which the strain sensor is located, the recess being defined in an axial surface of one of the radial webs such that, in use, the sensor lies at least proximate to one of the local neutral axes relating to one of a plurality of strains to which the flexplate is subject in use, wherein the strain sensor lies substantially on the neutral axis of twisting of the respective radial web in which the sensor is located.

2. The torque measurement flexplate of claim 1, wherein each radial web includes a formation for reducing the effect of twisting of the respective radial web in which the sensor is located.

3. The torque measurement flexplate of claim 2, wherein each radial web defines a pair of elongate slots, which provide the twist effect reduction formation.

4. The torque measurement flexplate of claim 3, wherein the slots include one of the following:
   slots extending along the length of the radial web;
   slots located on either side of the recess;
   slots equispaced on either side of the recess;
   slots formed as through slots;
   slots extending substantially parallel to each other;
   slots extending substantially radially;
   slots having a rounded end part;
   slots having a rounded end part at each end;
   slots including a body part, and the or each rounded end part is enlarged relative to the body part; and
   slots located in an area which is between 15% and 40% of the minimum width of the radial web from a side of the radial web.

5. The torque measurement flexplate of claim 1, wherein the number and radial location of the fastening holes correspond with the number and radial location of the axial through apertures.

6. The torque measurement flexplate of claim 1, wherein the flexplate further defines a plurality of circumferentially extending slots, one of which is located between each fastening hole and the outer edge of the flexplate.

7. The torque measurement flexplate of claim 6, wherein the flexplate includes a circumferential web which extends between each circumferentially extending slot and the corresponding axial through aperture.

8. The torque measurement flexplate of claim 7, wherein each fastening hole is located in the circumferential web between one of the axial through apertures and one of the circumferentially extending slots.

9. The torque measurement flexplate of claim 8, wherein the centreline of each fastening hole lies on substantially the same radius as the centreline of the corresponding axial through aperture, the corresponding circumferential web and the corresponding circumferentially extending slot.

10. The torque measurement flexplate of claim 9, wherein the flexplate comprises a substantially planar body having a substantially uniform thickness, and the thickness of the circumferential web is reduced relative to the thickness of the flexplate body.

11. The torque measurement flexplate of claim 10, wherein the thickness of the circumferential web is less than 75% of the thickness of the flexplate body and is greater than 30% of the flexplate body thickness.

12. The torque measurement flexplate of claim 1, wherein the depth of the recess is one of:
    greater than 40% of the flexplate body thickness;
    greater than 50% of the flexplate body thickness; and
    less than 75% of the thickness of the flexplate body.

13. The torque measurement flexplate of claim 1, wherein the flexplate includes a number of sensors and recesses, wherein the number may correspond to the number of radial webs, and wherein the recesses are only defined in one face of the flexplate at each location.

14. The torque measurement flexplate of claim 1, wherein the flexplate includes only three or only four through apertures which correspondingly form three or four radial webs.

15. The torque measurement flexplate of claim 1, wherein the or each strain sensor is a surface acoustic wave (SAW) device, which communicates in a non-contacting manner and which does not require active electronic components on the flexplate, and wherein the or each strain sensor does not require an installed power supply.

16. The torque measurement flexplate of claim 1, wherein the or each strain sensor includes a pair of sensing elements, which are arranged so that strains due to longitudinal bending of the respective radial web are substantially cancelled by common mode signal subtraction.

17. The torque measurement flexplate of claim 16, wherein the sensing elements are arranged at a first angle to each other, which first angle may be substantially 90°.

18. The torque measurement flexplate of claim 16, wherein both sensing elements are arranged substantially at a second angle to the longitudinal centreline axis of the respective radial web, which second angle is substantially 45°.

* * * * *